Feb. 19, 1952 — W. H. COLES — 2,586,517
WATER DISTRIBUTING DEVICE
Filed May 4, 1948 — 3 Sheets—Sheet 2

INVENTOR
Walter H. Coles
BY Marechal & Biebel
ATTORNEYS

Feb. 19, 1952  W. H. COLES  2,586,517
WATER DISTRIBUTING DEVICE

Filed May 4, 1948  3 Sheets—Sheet 3

INVENTOR
Walter H. Coles
BY
Marechal & Biebel
ATTORNEYS

Patented Feb. 19, 1952

2,586,517

UNITED STATES PATENT OFFICE 2,586,517

WATER DISTRIBUTING DEVICE

Walter H. Coles, Troy, Ohio, assignor to The Skinner Irrigation Company, Troy, Ohio, a corporation of Ohio Application May 4, 1948, Serial No. 24,980

19 Claims. (Cl. 299—69)

This invention relates to water distributing or sprinkling devices, and more particularly to rotatable sprinklers for distributing water over large areas of the ground.

One of the principal objects of the invention is to provide a rotating sprinkler device of the impact type for positive driving action which is adapted to be supplied from a water line at substantial pressure and to distribute the water in relatively large volume over a large area and which is so constructed that the reaction and end thrust forces developed in operation are controlled to promote smooth and uniform driving action with relatively low power requirements.

Another object is to provide such a rotating sprinkler device having a main nozzle for distributing water at the maximum range of the device, a secondary nozzle for distributing the water over a lesser range and a driving nozzle mounted for rotation with the main and secondary nozzles and cooperating with an oscillating impact arm to effect step-by-step rotation of the entire device.

Another object is to provide such a rotating sprinkler device of the impact type wherein the main and secondary nozzles are relatively offset to provide tangential reaction forces supplementing the driving action of the impact mechanism and wherein the three nozzles are so correlated with respect to capacity as to give substantially uniform distribution of water over the entire effective range of the device.

An additional object is to provide such a rotating sprinkler device wherein the secondary and driving nozzles are so positioned with respect to the main nozzle as to oppose and at least partially balance the back thrust of the main nozzle and wherein the respective capacities of the nozzles are correlated with respect to both the back thrust and the end thrust within the device to minimize load on the bearings and thus to reduce the power required for rotation.

It is also an object of the invention to provide a rotating sprinkler device of the impact type wherein the deflector for actuating the impact arm is so proportioned and arranged for cooperation with the driving nozzle as to assure uniform and positive driving action over a long effective life notwithstanding wear on the driving parts.

It is also an object of the invention to provide a rotating sprinkler device of the impact type having a simple and effective mechanism for adjusting the tension of the spring which controls the return movement of the impact arm to vary the rate of rotation of the device and including a simple releasable arrangement for positively locking the spring in adjusted position.

Other objects and advantages of the invention will be apparent from the following description, the accompanying drawings and the appended claims.

In accordance with the present invention, there is provided a rotating sprinkler device of the positively driven impact type which is particularly adapted for use in delivering water in relatively large volume over large areas of the ground such as fields of growing crops, and which is capable of distributing the water substantially uniformly over the entire effective range thereof under conditions requiring minimum driving power for rotation of the device. Since such large volume, large coverage sprinkling devices employ a supply of water at considerable pressure, relatively high axial and angular reaction and thrust forces may be involved, and the invention provides for controlling such forces to minimize the load therefrom on the driving mechanism. In addition, the invention provides a rotating sprinkling device wherein the driving nozzle and its cooperating oscillating impact arm effect rotation of the device at a readily controlled rate and wherein also the other nozzles are so arranged as to provide tangential reaction forces supplementing the action of the impact mechanism and thus further reducing the power required from the impact mechanism as well as the weight of the impact arm.

Figure 1:
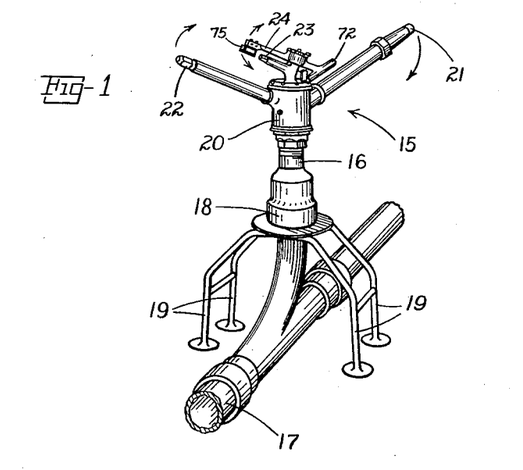
Fig. 1 is a perspective view showing a rotating sprinkler device in accordance with the invention mounted in position for use.

Referring to the drawings, which illustrate a preferred embodiment of the invention, Fig. 1 shows a complete sprinkler device of the impact type identified generally as 15 mounted on the upper end of a branch pipe 16 extending upwardly from a main pipe line 17, the device being supported by a saddle-like stand 18 having four legs 19 arranged to straddle the pipe line 17, any suitable stand or supporting structure being usable. The sprinkler 15 includes a distributing head 20 supported for rotation on a vertical axis with respect to pipe 16 and carrying a main discharge nozzle 21 for distributing water over the area at the maximum range of the device and a secondary discharge nozzle 22 of smaller capacity than the main nozzle and located on the opposite side of the distributing head from nozzle 21 for distributing water over an area of lesser radius inwardly of the area covered by the main nozzle. The sprinkler 15 also includes a driving nozzle 23 cooperating with an oscillating impact arm 24 to cause the desired rotation of the nozzle assembly in a series of step-by-step movements.

Figure 7:
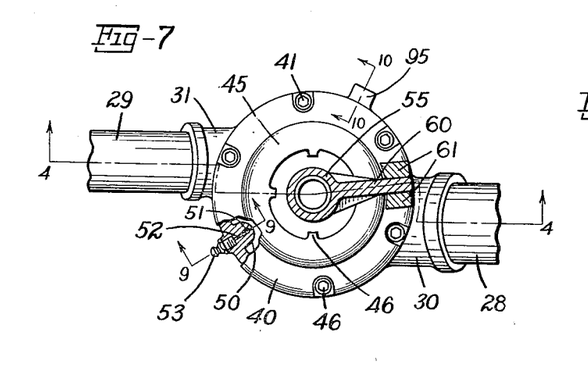
Fig. 7 is a plan view of the device partly in section on the line 7—7 of Fig. 4 and partly broken away to show details of the lubricating system.

The nozzle assembly is supported on the pipe 16 by a fixed standard 25 (Fig. 4), which is threaded on the upper end of pipe 16 and constitutes the central support for the distributing head 20 and the nozzles. The head 20 is rotatably supported on standard 25 and receives water therefrom through a series of angularly spaced openings 26 in the standard separated by vertical rib portions 27. The nozzles 21 and 22 include pipe sections 28 and 29 respectively, which are in turn threaded into respective boss portions 30 and 31 of distributing head 20. As shown in Fig. 7, the bosses 30 and 31 are arranged in parallel relation at opposite sides of the head 20, but they are laterally offset with respect to the axis of the device so that they extend outwardly in generally tangential relation to the distributing head. With this construction, the back thrusts of nozzles 21 and 22 in operation will be opposed and will thus tend to counter-act each other and to reduce the lateral reaction on pipe 16 and stand 18. At the same time, the laterally offset relation of the nozzles will provide an angular reaction component from the nozzles tending to rotate the distributing head on standard 25.

Figure 8:
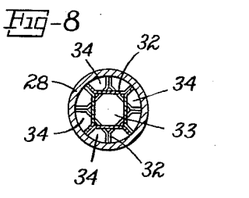
Fig. 8 is a detail view showing one of the stream rectifiers in the nozzle arm, the view being taken in section on the line 8—8 of Fig. 4.

In order to assure uniform discharge of water from nozzles 21 and 22, each of the pipe sections or nozzle arms 28 and 29 is provided with a pair of stream rectifiers 32 (Figs. 4 and 8) for straightening out the flow therethrough and effecting uniformity in the stream before discharge from the nozzles. As shown in Fig. 8, each of the rectifiers 32 is composed of four flanged strips of sheet metal secured within the pipe section 28 or 29 and formed to provide a square central passage 33 and four outer passages 34 for the water. In addition, the two rectifiers of each pair are turned at substantially 90° to each other, this arrangement having been found to promote improved uniformity of flow and discharge.

Figures 4, 5, 6:
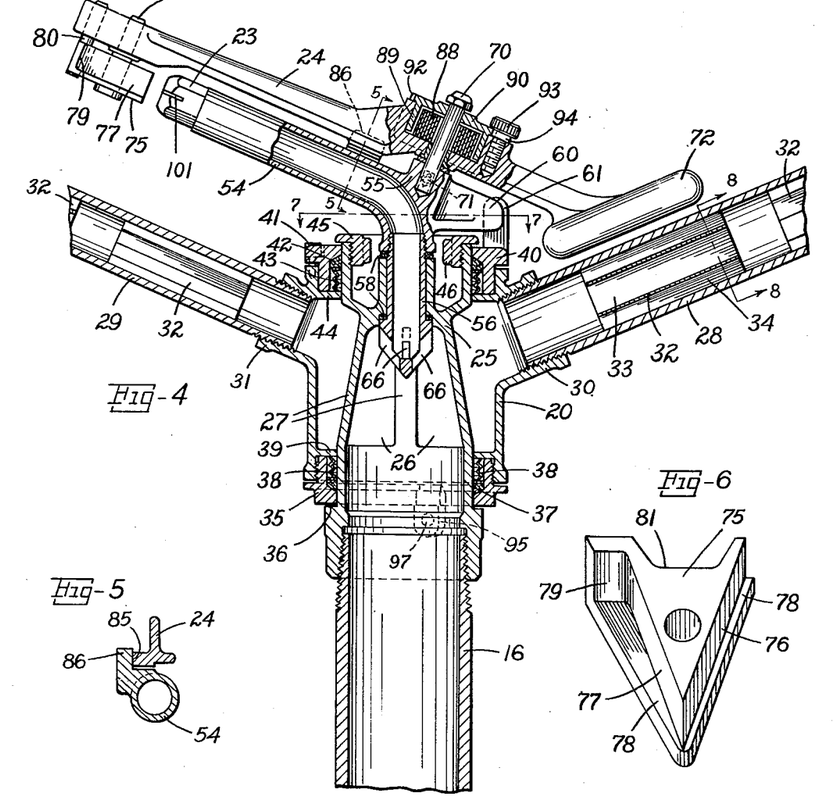
Fig. 4 is an enlarged view of the device partly in side elevation and partly in section on the line 4—4 of Fig. 7.
Fig. 5 is a detail view in section on the line 5—5 of Fig. 4.
Fig. 6 is an enlarged detail view in perspective showing the deflector on the impact arm.

At its lower end, the distributing head 20 is internally threaded to receive a collar 35 which forms a sleeve bearing on standard 25 and is limited in its downward axial movement by a circumferential shoulder portion 36 of the standard. This part of the device is sealed against leakage by a packing ring 37 of leather or other suitable material which is received between the standard 25 and collar 35 and is pressed into sealing engagement with the junction between these parts by a spring 38 of the bellows type bearing against an annular inner flange portion 39 of the distributing head. The upper end of collar 35 also seats against flange 39 to complete the seal between these portions of the distributing head and the standard while still permitting desired relative rotation thereof.

A similar sealing unit is provided at the upper end of the head 20 and standard 25, and it includes a collar 40 secured to the upper end of the distributing head by means of screws 41. The collar 40 forms a sleeve bearing for the upper end of the distributing head, and the junction between collar 40 and the standard is sealed by a packing ring 42 similar to the ring 37 and similarly pressed into sealing position by a spring 43 bearing against an annular flange portion 44 of the distributing head. The lower end of collar 40 also seats against flange 44 to complete the desired seal. An annular collar 45 is threaded into the upper end of the standard and extends radially outwardly a sufficient distance to overlap the upper end of collar 40 and thus to retain the distributing head and the parts secured thereto on the standard. A series of lugs 46 extending radially inwardly of collar 45 provide for readily tightening the collar into position by means of a suitable spanner wrench.

In order to provide for balance within this sprinkler between the end thrust resulting from line pressure and the downward component of the backward thrusts of the nozzles, the upper cylindrical portion of standard 25 which extends through the flange 44 is formed of reduced diameter with respect to the corresponding cylindrical portion of the standard which extends through the flange 39. Thus the flange 44 has a greater effective area exposed to the line pressure than the flange 39, and this difference in area is so correlated with the downward reaction force from the nozzles and the weight of the nozzle assembly as to provide substantial balance between the axial forces effective on the sprinkler in use. As a result, when the device is operated within the proper range of line pressure for which it is designed, it will be found that the axial forces are so well balanced that the distributing head will rotate on standard 25 without exerting appreciable axial load on either shoulder 36 or collar 45.

Figure 9:
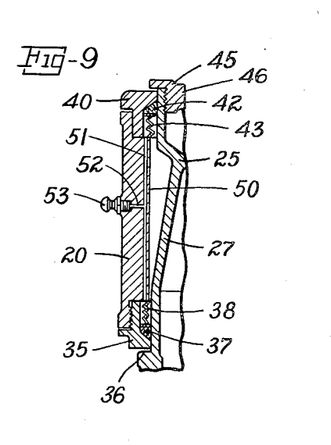
Fig. 9 is a fragmentary section on the line 9—9 of Fig. 7 showing the lubricating system.

Provision is also made for ready lubrication of the bearing surfaces of the collars 35 and 40 and the standard 25. Referring to Figs. 7 and 9, a vertical rib 50 is formed to project inwardly on the inner surface of the distributing head 20 and to extend vertically between the flanges 39 and 44. This rib 50 encloses a lubricating duct 51 communicating with the spaces respectively below and above these flanges which contain springs 38 and 43. A radially extending duct 52 leads from the duct 51 to the outer surface of head 20, and it is provided with a suitable niple 53 or like fixture for receiving lubricant from a grease gun, thus facilitating ready lubrication of the relatively rotating surfaces of the device.

Figure 11:
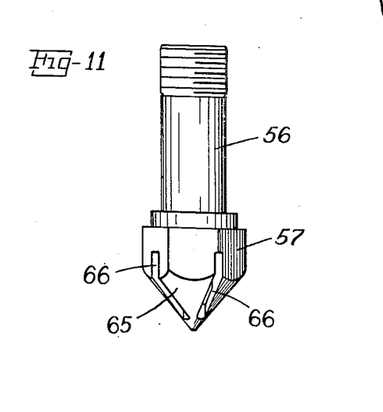
Fig. 11 is a detail view of the member for connecting the driving nozzle to the central support.

The driving nozzle 23 is threaded into the outer end of an upwardly and outwardly projecting elbow portion 54 of the driving nozzle body 55, which is in turn rotatably supported on standard 25 by means of a shouldered tube 56 (Figs. 4 and 11) having its upper end threaded into the lower end of the elbow portion of body 55. The lower or head end of tube 56 is retained within standard 25 and includes a hexagonal portion 57 facilitating assembly of these parts with a socket wrench. Packing washers 58 of leather or other suitable material provide for sealing the joints between tube 56 and standard 25 and between body 55 and the standard while still permitting rotation of the body and tube in coaxial relation with the standard.

In order to connect the driving nozzle in driving relation with the remainder of the nozzle assembly, the driving nozzle body 55 is provided with a projection 60 which extends radially outwardly therefrom in the opposite direction from elbow portion 54 and is received between a pair of upwardly extending lugs or yoke arms 61 on collar 40. In the assembly of the device, the collar 40 is so located and held in position by screws 41 with respect to the distributing head 20 that lugs 61 cooperate with projection 60 to align nozzle 23 in substantial parallelism with the secondary nozzle 22 so that the back thrust from the driving nozzle will supplement the back thrust from nozzle 22 in opposing the back thrust from main nozzle 21.

The end of the head portion of tube 56 is formed with a generally conical surface 65 (Fig. 11), and a plurality of slots 66 extend radially through this surface and the hexagonal part 57 of the tube head to communicate with the inner bore of the tube for transmitting water from within support 25 to the driving nozzle. This head portion of the tube thus acts as a strainer to prevent the passage of solid particles in the water which might clog the relatively small discharge aperture of driving nozzle 23. At the same time the conical surface 65 serves to deflect such particles outwardly to the nozzles 21 and 22, from which they will be readily discharged without difficulty since the discharge apertures of these nozzles are relatively much larger than that of nozzle 23.

The impact arm 24 is mounted for oscillating movement with respect to driving nozzle 23 by means of a stud 70 set in the upper part of the driving nozzle body 55 and held against movement therein by a set screw 71, the stud 70 being inclined at an angle to the vertical to support arm 24 in a plane parallel to the plane of inclination of elbow portion 54 and nozzle 23. One end of the impact arm projects rearwardly with respect to nozzle 23 to form a counterweight portion 72. The forward end of the arm projects beyond the discharge end of nozzle 23 and carries a stud 73 forming a pivotal support for a deflector 75 arranged to swing back and forth in front of the stream or driving jet from nozzle 23 and shown in detail in Fig. 6.

The deflector 75 is of generally triangular form and is provided with diverging water engaging surfaces 76 and 77, each of which is shown with a lower flange projection 78, and the surface 77 is also provided with an extension portion 79 forming a wing extending outwardly therefrom in a plane substantially perpendicular to the central plane of the deflector. The pivotal movement of deflector 75 on stud 73 is limited by a pin 80, which extends downwardly from the outer end of arm 24 and engages within a recessed portion 81 in the outer end of the deflector, the pin 80 and stud 73 each being held within the arm by means of set screws 82 and 83 as shown in Fig. 3.

Figure 3:
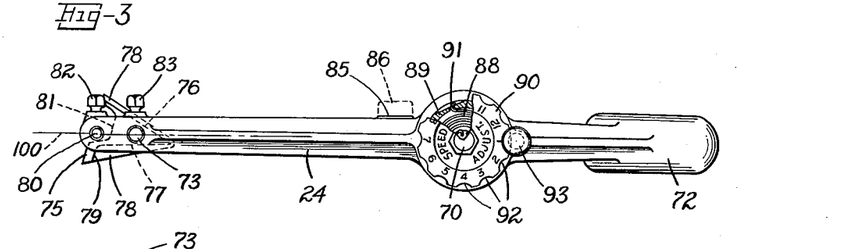
Fig. 3 is a top plan view of the impact arm of the device.

A portion 85 of the impact arm forms an impact face adapted to strike against a boss 86 which projects upwardly at a suitable location on the driving nozzle member 55 to form a stop for limiting movement of the arm in a clockwise direction as viewed in Fig. 3, the relation of these parts being more readily seen in Fig. 5. The impact arm is yieldingly urged against this stop by means of a spiral spring 88, which is received within the cylindrical portion 89 of a cap 90 cooperating with a cylindrical recess in the upper surface of the impact arm to form a housing for the spring.

Means are provided for adjusting the tension of spring 88 to vary the force thereof on arm 24. As shown in Fig. 3, one end of spring 88 is received in a notch or groove provided in the stud 70 and the other end is received in a slot 91 in the cap portion 89, the outer surface of this part of cap portion 89 being flattened for clearance in the housing. Accordingly, since the stud 70 is held by set screw 71 against movement in body 55, rotation of the cap 90 will adjust the tension in spring 88.

In order to hold the cap 90 and spring 88 in adjusted position, the circumferential periphery of the cap is provided with a series of angularly spaced arcuate notches 92, and a knurled thumb screw 93 is threaded into the arm 24. The screw 93 includes a shouldered portion 94, and its dimensions and location are such that this shouldered portion will engage in a selected notch 92 when the screw is tightened into the fixture, but when the screw is backed off sufficiently for its shouldered portion to clear cap 90, the cap can be rotated manually to adjust the spring. The upper surface of the cap carries a series of numerical indicia (Fig. 3) corresponding with the notches 92 for selecting the desired tension in the spring. The screw 93 cooperates with these notches to lock the cap and spring in any selected position of adjustment corresponding to a selected one of the notches, and it will be noted that this screw can be backed off to unlock the cap without being wholly removed from the arm 24 and without requiring the use of any tools.

Figure 10:
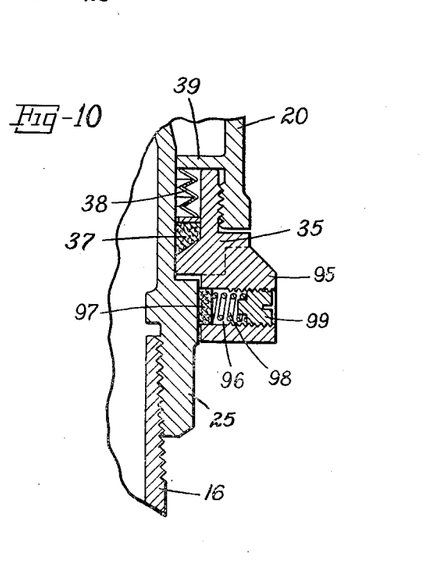
Fig. 10 is an enlarged fragmentary view in section on the line 10—10 of Fig. 7 showing the brake assembly.

Control over the rate of rotation of the sprinkler is also afforded by means of a brake assembly shown in detail in Fig. 10. It includes a boss portion 95 extending downwardly from the collar 35 and provided with a radial bore 96. A brake member 97 of leather or other suitable material is mounted within the bore 96 and is urged into adjustably yielding engagement with the outer surface of standard 25 by a spring 98 and screw 99 threaded in the outer end of bore 96, the resulting frictional contact between brake member 97 and the standard providing a braking action retarding rotation of the device.

Figure 2:
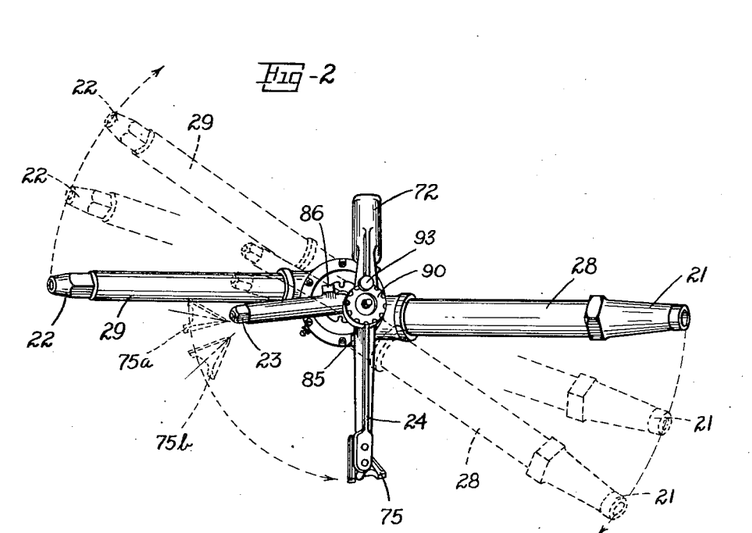
Fig. 2 is a somewhat diagrammatic plan view illustrating the rotary movement of the nozzle assembly and the operation of the impact arm causing such rotation.

The operation of the impact arm in cooperating with the driving nozzle and driving nozzle body to effect step-by-step rotational movement of the sprinkler is illustrated somewhat diagrammatically in Fig. 2. The spring 88 normally urges the arm 24 in a clockwise direction as viewed from above and into a position of contact between its impact face 85 and the stop 86 on the driving nozzle body 55. In this position of the parts, the deflector 75 should occupy the relative position shown in Fig. 3 and indicated in dotted lines at 75a in Fig. 2, with its surface 76 opposed to the stream or driving jet from nozzle 23. If the deflector is initially in any other position with respect to arm 24, for example as shown at 75b in Fig. 2, the force of the driving jet acting on the wing portion 79 of the surface 77 will swing the deflector about pivot stud 73 to the position shown in Fig. 3.

In these relative positions of the deflector and arm 24 with respect to the driving nozzle, the force of the stream or driving jet striking the surface 76 between the point of the deflector and the central plane of arm 24 passing through the axis of pivot stud 73, which is represented by the dotted line 100 in Fig. 3, will cause the arm to swing in a counterclockwise direction as illustrated in Fig. 2, this movement being in opposition to the force exerted on the arm by spring 88. It will be noted that as the arm swings away from the nozzle, the stream will strike the surface 76 on the opposite side of plane 100 to cause the vane to swing in a counterclockwise direction on its pivot 73 to the position shown in dotted lines at 75b in Fig. 2, but this action does not affect the force of the initial impact of the stream on surface 76 or the operation of the arm.

During the counterclockwise movement of the arm 24, the spring 88 will be wound up until it gradually overcomes the inertia of the arm and causes it to reverse its movement and to swing back and strike its impact surface 85 against the stop 86. If the deflector is in the relative position shown at 75b as it approaches the stream from nozzle 23 on the return stroke of the arm, it will reenter the stream with its point foremost. If it is in any other position such as that shown at 75a, the stream will first strike the rearward part of the surface 76 and thus swing the deflector to the position 75b. Thus in either case, the force of the stream striking the surface 77 between plane 100 and the point of the deflector will add an extra impulse to that of the stream to increase the impact of the arm against the stop 86, the point of the deflector carrying completely through the stream. Then when the arm has reached its limit position determined by the stop, the force of the stream will strike the outer part of the surface 77, including the wing 79, on the opposite side of plane 100 and will thus cause the deflector to swing about pivot stud 73 into the position shown at 75a in Fig. 2. This motion thus results in resetting the deflector to initiate the next counterclockwise movement. It will thus be noted that the wing portion 79 on the deflector 75 assures proper resetting of the deflector at the end of each stroke as described, even though the contacting surfaces of the parts 85 and 86 should be worn to such an extent that the surface 77 of the deflector would be carried beyond the stream from nozzle 23 and without retarding the blow of the impact arm.

It will accordingly be seen that the arm 24 will continually oscillate with respect to nozzle 23 to cause a series of periodic impacts against the stop 86, thus causing the nozzle to rotate in a series of step-by-step movements. Since the nozzle 23 and nozzle body 55 are connected to the distributing head 20 through the interlocking parts 60 and 61, the distributing head and the entire assembly including nozzles 21 and 22 will move with nozzle 23 as indicated in dotted lines in Fig. 2. This movement will continue so long as the water pressure is on, and its rate will depend upon the setting of the brake screw 99 and upon the tension adjustment in spring 88, the latter being effective to control the frequency with which the swinging movements of the arm and the impacts between the parts 85 and 86 occur.

This construction of sprinkler thus provides for effecting distribution of water at a desired high rate over a large circular area surrounding the device without the necessity for a heavy or bulky supporting structure to absorb back thrust and to prevent the device from turning over under the relatively high pressures which may be employed therewith. For example, with the nozzle 21 having an inner diameter of 1⅛ inches and utilizing an inlet pipe 16 having an inner diameter of 2½ inches, this sprinkler at 100 pounds' pressure per square inch will deliver water at the rate of approximately 400 gallons per minute over an area substantially 400 feet in diameter, i. e. nearly three acres.

In operation, the nozzle 21 distributes the water over a generally annular area at the maximum range of the device. The secondary nozzle 22 distributes water over an area of similarly generally annular shape but of lesser radius and hence located inwardly of the maximum range of nozzle 21, the spray from the two nozzles 21 and 22 overlapping over a portion of their respective ranges. The nozzle 22 and the driving nozzle 23 are so correlated in capacity with the main nozzle that the three nozzles together distribute water substantially uniformly over the entire area within the effective range of the device, the nozzle 23 being shown as provided with a slot 101 in the outer end thereof which extends radially in the direction opposite the direction of rotation of the sprinkler to distribute water over the area closely adjacent the device.

The following table illustrates respective sizes of the three nozzles found satisfactory for this desired uniform distribution, the dimensions given being the inner diameters in inches:

| Main Nozzle | Secondary Nozzle | Driving Nozzle |
|---|---|---|
| ½ | ⅜ | ¼ |
| ⅝ | ⅜ | ¼ |
| ¾ | ⅜ | ¼ |
| ⅞ | 13/32 | ¼ |
| 1 | 15/32 | ¼ |
| 1⅛ | 17/32 | ¼ |

The proper size of sprinkler should be chosen in connection with the available pressure, the area to be covered and the rate of watering desired, which range from 90 gallons per minute over an area 160 feet in diameter at 50 pounds pressure for the smallest of the above sets of nozzle sizes to the maximum already given above.

This construction of sprinkler has been found to give positive driving action with a minimum of driving power while distributing water in large volume over relatively large areas of the above indicated range. As already described, the axial thrust within the distributing head is balanced with the downward component of the reaction forces from the nozzles to minimize axial load on the bearings for the rotating parts. In addition, although the capacity of main nozzle 21 is greater than the combined capacities of the secondary nozzle 22 and driving nozzle 23, and although the back thrust of the main nozzle is thus somewhat greater, still any net remaining thrust force is within a range such that its effect on the central support does not objectionably interfere with the desired free rotation of the distributing head. Furthermore, the resultant thrust is so low as to avoid the necessity for complex or heavy stands for the sprinklers, the device having been used successfully under maximum pressure conditions with a relatively light stand 18 having its opposed pairs of legs 19 only approximately two feet apart.

It should also be noted that the arrangement of the nozzles 21 and 22 in laterally offset relation has the further advantage of changing a portion of the back thrusts therefrom into components directed tangentially of the device to supplement the rotating effect of the driving nozzle and impact arm. Moreover, under these conditions any disparity between the downward components of the back thrust on the two sides of the distributing head is brought down to a point where it is not seriously objectionable. The construction and arrangement of the deflector 75 as described is also advantageous in promoting desired operating conditions with minimum power requirements since it assures regular and positive operation of the impact arm without retarding or otherwise affecting the power of the blows delivered by the arm.

This sprinkler is accordingly particularly useful for distributing a relatively large volume of water over a large area of the ground, and it is readily produced in a variety of sizes to suit particular pressure conditions. It is simple in construction, and all the working parts are readily accessible for simple and economical replacement if necessary. In addition, the rate of rotation of the nozzles is readily controlled by means of the torsion spring adjustment to provide a range for example from as low as 1 revolution in 40 minutes to 1 revolution in 4 minutes, and the mechanism for adjusting the spring to vary the speed is simple and positive in action and requires no tools, thus facilitating quick adjustment in the field to suit prevailing conditions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A rotating sprinkler device of the impact type comprising a central support adapted for connection to a supply of water under pressure, a main nozzle assembly rotatably mounted upon said support and including a plurality of water distributing nozzles for discharging water therefrom in such direction that the reaction forces thereof are opposed to each other with a substantially reduced resultant force effective upon said support, a driving nozzle mounted for rotation with respect to said support for producing a driving jet, means for causing said driving nozzle to rotate simultaneously with and in predetermined fixed relation to said main nozzle assembly such that the reaction force thereof substantially balances said resultant force, an impact arm, and means for mounting said impact arm for oscillation relative to said nozzle assembly in response to the force thereon of said driving jet to effect step-by-step rotation of said nozzles with respect to said support.

2. A rotating sprinkler device of the impact type for producing a substantially uniform distribution over a substantial area comprising a central support adapted for connection to a supply of water under pressure, a main nozzle assembly rotatably mounted upon said support and including a main discharge nozzle and a secondary discharge nozzle of lesser capacity than said main nozzle located substantially opposite said main nozzle to provide a reaction force opposing the reaction force developed by said main nozzle, a driving nozzle of lesser capacity than said secondary nozzle located in substantially the same vertical plane therewith for producing a driving jet in the direction substantially opposite the jet from said main nozzle, means for causing said driving nozzle to rotate simultaneously with and in predetermined fixed relation to said main nozzle assembly such that the reaction force thereof substantially balances the resultant reaction force of said main and said secondary nozzles, an impact arm, and means for mounting said impact arm for oscillation relative to said nozzle assembly in response to the force thereon of said driving jet to effect step-by-step rotation of said nozzles with respect to said support.

3. A rotating sprinkler device of the impact type comprising a central support adapted for connection to a supply of water under pressure, a distributing head rotatably secured to said support, a main nozzle extending upwardly and outwardly from said distributing head, a secondary nozzle of lesser capacity than said main nozzle extending upwardly and outwardly from said distributing head in a direction opposite said main nozzle, a driving nozzle mounted for rotation with said distributing head and extending upwardly and outwardly with respect thereto in a direction opposite said main nozzle, the respective capacities of said driving nozzle and said secondary nozzle being so correlated with the capacity of said main nozzle that the combined back thrust of said driving and said secondary nozzles substantially counteracts the back thrust of said main nozzle, and impact means mounted for oscillatory movement with respect to said driving nozzle and cooperating therewith to effect step-by-step rotation of said nozzles with respect to said support.

4. A rotating sprinkler device of the impact type comprising a central support adapted for connection to a supply of water under pressure, a distributing head rotatably secured to said support, a relatively small driving nozzle mounted for rotation with said distributing head and extending outwardly with respect thereto, impact means mounted for oscillatory movement with respect to said driving nozzle and cooperating therewith to effect step-by-step rotation of said distributing head with respect to said support, and a plurality of discharge nozzles extending outwardly in substantially opposite directions from said distributing head forming the main discharge outlets, said discharge nozzles being substantially parallel but laterally offset in opposite directions with respect to the axis of said distributing head to provide tangential reaction forces supplementing said step-by-step rotating action of said driving nozzle and impact arm but insufficient to produce continuous rotation thereof.

5. A rotating sprinkler device of the impact type comprising a central support adapted for connection to a supply of water under pressure, a distributing head rotatably secured to said support, a main nozzle extending upwardly and outwardly from said distributing head for distributing water over a predetermined outer area of relatively large radius, a secondary nozzle of smaller capacity than said main nozzle for distributing water over an area of lesser radius than said outer area, said secondary nozzle extending upwardly and outwardly from said distributing head in the direction opposite said main nozzle to provide a back thrust opposing the back thrust of said main nozzle, a driving nozzle of smaller capacity than said secondary nozzle mounted for rotation with respect to said support and said distributing head and extending upwardly and outwardly therefrom, impact means mounted for oscillatory movement with respect to said driving nozzle and cooperating therewith to effect step-by-step rotation thereof with respect to said support, means connecting said driving nozzle in predetermined fixed relation with said distributing head to transmit said rotary movement of said driving nozzle to said distributing head for effecting rotation of said distributing head and of all said nozzles with respect to said support, and means for aligning said driving nozzle in a direction opposite said main nozzle and generally in the plane of said secondary nozzle to supplement the action of said secondary nozzle in opposing the back thrust of said main nozzle.

6. A rotating sprinkler device of the impact type comprising a central support adapted for connection to a supply of water under pressure, a distributing head rotatably secured to said support, a main nozzle extending outwardly from said distributing head and in tangential relation therewith, a secondary nozzle of lesser capacity than said main nozzle extending outwardly in tangential relation with said distributing head in the opposite direction from said main nozzle to provide a back thrust opposing the back thrust of said main nozzle, a driving nozzle mounted for rotation with respect to said distributing head and extending outwardly with relation thereto in substantially the same direction as said secondary nozzle to supplement the action of said secondary nozzle in opposing the back thrust of the said main nozzle, and impact means mounted for oscillatory movement with respect to said driving nozzle and cooperating therewith to effect step-by-step rotation of said device.

7. A rotating sprinkler device of the impact type comprising a central support adapted for connection to a supply of water under pressure, a main nozzle assembly rotatably mounted upon said support and including a plurality of water distributing nozzles for discharging water therefrom in such direction that the reaction forces thereof are opposed to each other with a substantially reduced resultant force effective upon said support, said nozzles being inclined upwardly from said assembly to provide a downwardly directed component of force, said support including vertically spaced cylindrical portions providing upper and lower bearing surfaces for said assembly, said upper cylindrical portion being of lesser diameter than said lower cylindrical portion to provide a net upwardly directed force effective on said assembly due to the discharge pressure to counteract said downwardly directed component of the back thrust from said nozzles, a driving nozzle mounted for rotation with respect to said support for producing a driving jet, an impact arm, and means for mounting said impact arm for oscillation relative to said nozzle assembly in response to the force thereon of said driving jet to effect step-by-step rotation of said nozzles with respect to said support.

8. A rotating sprinkler device of the impact type comprising a central support adapted for connection to a supply of water under pressure, a distributing head rotatably secured to said support, a main nozzle extending outwardly from said distributing head constructed and arranged for distributing water over an annular area of relatively large radius at the outermost range of said device, a secondary nozzle of lesser capacity than said main nozzle constructed and arranged for watering an intermediate area inwardly of the area reached by said main nozzle, a driving nozzle of lesser capacity than said secondary nozzle constructed and arranged for watering an area inwardly of said intermediate area and immediately adjacent said device, means for mounting said driving nozzle in predetermined fixed relation with said distributing head, and impact means mounted for oscillatory movement with respect to said driving nozzle and cooperating therewith to effect step-by-step rotation of said distributing head with respect to said support.

9. A rotating sprinkler device of the impact type comprising a central support adapted for connection to a supply of water under pressure, a distributing head rotatably secured to said support, main and secondary nozzles extending outwardly in opposite directions from said distributing head, a driving nozzle, means for securing said driving nozzle to said distributing head in predetermined fixed relation, a tube having an enlarged head rotatably received within said support, means securing said tube to said driving nozzle to connect said driving nozzle and said support in rotatable relation, said tube head having a restricted aperture therethrough for transmitting water to said driving nozzle while preventing the passage of solid particles capable of clogging said driving nozzle, and impact means mounted for oscillatory movement with respect to said driving nozzle and cooperating therewith to effect step-by-step rotation of said distributing head with respect to said support.

10. A rotating sprinkler device of the impact type comprising a central support adapted for connection to a supply of water under pressure, a distributing head rotatably secured to said support, main and secondary nozzles extending outwardly in opposite directions from said distributing head, a driving nozzle including a driving nozzle body, a tube securing said driving nozzle body in rotatable relation with said support and including an enlarged head portion positioned within said support, said tube head having restricted apertures therethrough for transmitting water to said driving nozzle while preventing the passage of solid particles capable of clogging said driving nozzle, the outer surface of said tube head including an inverted conical portion positioned substantially between the inner ends of said main and secondary nozzles to deflect such particles outwardly for discharge from said main and secondary nozzles, and impact means mounted on said driving nozzle body for oscillatory movement with respect to said driving nozzle and cooperating therewith to effect step-by-step rotation of said device.

11. A rotating sprinkler device of the impact type comprising a central support adapted for connection to a supply of water under pressure, a distributing head rotatably secured to said support, a pair of nozzles extending upwardly and outwardly from said distributing head in generally opposite directions, a driving nozzle mounted for coaxial rotation with respect to said support and extending upwardly and outwardly therefrom in such relation with said pair of nozzles as to substantially balance the reaction forces thereof, an impact arm mounted for oscillatory movement with respect to said driving nozzle, a deflector on said arm arranged to swing back and forth in front of said driving nozzle and to cause oscillatory movement of said arm in response to the action thereon of the stream from said driving nozzle, spring means carried by said arm and arranged to urge said arm to a position wherein said deflector is brought into said stream, impact means on said driving nozzle cooperating with said arm to cause step-by-step rotation of said driving nozzle in response to the oscillatory movement of said arm, and means directly connecting said driving nozzle and said distributing head to effect rotation of said distributing head in response to rotation of said driving nozzle and in predetermined fixed relation thereto.

12. A rotating sprinkler device of the impact type comprising a central support adapted for connection to a supply of water under pressure, a distributing head rotatably secured to said support, a pair of nozzles extending upwardly and outwardly from said distributing head in opposite directions, a driving nozzle mounted for rotation with said distributing head and extending upwardly and outwardly therefrom in predetermined relation to said pair of nozzles to substantially balance the reaction forces thereof, an arm mounted for oscillatory movement with respect to said driving nozzle, a deflector on said arm arranged to swing back and forth in front of said driving nozzle and to cause oscillatory movement of said arm in response to the action thereon of the stream from said driving nozzle, impact means on said driving nozzle cooperating with said arm to cause step-by-step rotation of said driving nozzle in response to the oscillatory movement of said arm, means for causing said driving nozzle to rotate simultaneously with and in predetermined fixed relation to said main nozzle assembly, a torsion spring for causing movement of said arm to a position wherein said deflector is brought into said stream, means in said arm forming a housing for said spring, means for holding one end of said spring relatively stationary, a cap for said housing, means for securing the other end of said spring to said cap for adjusting movement in response to relative rotation of said cap and said housing, the circumferential periphery of said cap having a plurality of angularly spaced notches therein, and a bolt threadedly received in said arm and including a portion adapted for selective engagement in said notches to hold said cap and spring in selected adjusted position in accordance with the desired rate of rotation of said distributing head.

13. In a rotating sprinkler device of the impact type including a rotary distributing head having a plurality of discharge nozzles and a driving nozzle the reaction force of which substantially balances that of said plurality of discharge nozzles, said driving nozzle being provided with an oscillating impact arm having an oscillating deflector thereon for effecting step-by-step rotational movement of said distributing head, the combination of a torsion spring for causing movement of said arm in one direction, means in said arm forming a housing for said spring, means for holding one end of said spring relatively stationary, a cap for said housing, means for securing the other end of said spring to said cap for adjusting movement in response to relative rotation of said cap and said housing, the circumferential periphery of said cap having a plurality of angularly spaced notches therein, and a bolt threadedly received in said arm and including a portion adapted for selective engagement in said notches to hold said cap and spring in selected adjusted position in accordance with the desired rate of rotation of said distributing head.

14. In a rotating sprinkler device of the impact type including a rotary distributing head having a plurality of discharge nozzles and a driving nozzle the reaction force of which substantially balances that of said plurality of discharge nozzles, said driving nozzle being provided with an oscillating impact arm having an oscillating deflector thereon for effecting step-by-step rotational movement of said distributing head, the combination of a torsion spring for causing movement of said arm in one direction, means in said arm forming a housing for said spring, means for holding one end of said spring relatively stationary, a cap for said housing, means for securing the other end of said spring to said cap for adjusting movement in response to relative rotation of said cap and said housing, the circumferential periphery of said cap having a plurality of angularly spaced notches therein, and a bolt including a threaded lower portion threadedly received in said arm and including also an upper portion of larger diameter than said threaded portion adapted for selective engagement in said notches to hold said cap and spring in selected adjusted position in accordance with the desired rate of rotation of said distributing head, said threaded bolt portion being of sufficient length to provide for disengagement of said upper bolt portion from said notches without removal of said bolt from said arm.

15. A rotating sprinkler device of the impact type comprising a central support adapted for connection to a supply of water under pressure, a distributing head rotatably secured to said support, a pair of main nozzles extending upwardly and outwardly from said distributing head in generally opposite directions each adapted to discharge a relatively large volume of water, a driving nozzle of relatively small capacity mounted for coaxial rotation with said distributing head in predetermined fixed relation with said main nozzles and substantially balanced therewith as to size, pattern of distribution and reaction forces, an impact arm mounted for oscillatory movement with respect to said driving nozzle, a deflector on said arm arranged to swing back and forth in front of said driving nozzle and to cause oscillatory movement of said arm in response to the action thereon of the stream from said driving nozzle, impact means on said driving nozzle cooperating with said arm to cause step-by-step rotation of said driving nozzle in response to the oscillatory movement of said arm, said deflector having two surfaces diverging from a common point and adapted for selectively intercepting said stream from said driving nozzle, one of said surfaces cooperating with said stream to cause said arm to swing away from said impact means, the other of said surfaces having a wing portion spaced from said point and extending outwardly at a substantial angle to said other surface to intercept said stream after said point has passed through said stream to shift said deflector to a position wherein the first named of said surfaces intercepts said stream upon occurrence of the impact.

16. A rotating sprinkler device of the impact type comprising a central support adapted for connection to a supply of water under pressure, a main nozzle assembly rotatably mounted upon said support and including a plurality of water distributing nozzles for discharging a relatively large volume of water therefrom, a driving nozzle mounted for rotation with said nozzle assembly and substantially balanced therewith as to size, pattern of distribution and reaction forces, an impact arm mounted for oscillatory movement with respect to said driving nozzle, a stop carried by said driving nozzle in position to be struck by said arm and cooperating therewith to cause step-by-step rotation of said driving nozzle in response to the oscillatory movement of said arm, a deflector on said arm arranged to swing back and forth in front of said driving nozzle, said deflector having two surfaces diverging from a common point and adapted for selectively intercepting said driving jet, one of said surfaces cooperating with said jet to cause said arm to swing away from said stop and also cooperating with said jet on the return swing of said arm to reverse said deflector to a position presenting the other of said diverging surfaces to said jet, said stop being so positioned with respect to said arm that said point of said deflector carries substantially through said jet on said return stroke of said arm, the other of said diverging surfaces having a wind portion spaced from said point and extending outwardly therefrom at a substantial angle thereto to intercept said jet after said point has passed therethrough for reversing said deflector to a position wherein the first named of said surfaces intercepts said jet.

17. A sprinkler as defined in claim 8 in which the driving nozzle is provided with a slot extending outwardly and laterally thereof providing for distributing the wash water in a pattern immediately adjacent the device.

18. A rotating sprinkler device adapted to produce substantially uniform distribution of water comprising a central support adapted to be connected to a supply of water under pressure, a distributor head rotatably secured on said support, a main nozzle for distributing water over a predetermined outer area of relatively large radius, a secondary nozzle of smaller capacity than said main nozzle for distributing water over an intermediate area of lesser radius than said outer area, a third nozzle of smaller capacity than said secondary nozzle for distributing water over an area inwardly of said intermediate area and immediately adjacent said device, means for locating all of said nozzles in predetermined fixed relation to each other, means for mounting all of said nozzles on said head in predetermined fixed relation to each other such that the reaction thrusts therefrom are substantially balanced with reduced frictional drag on said support, and low power operating means actuated in response to the flow of water through said device for rotating said head on said support to produce substantially uniform distribution of water over said entire area.

19. A rotating sprinkler device adapted to produce substantially uniform distribution of water comprising a central support adapted to be connected to a supply of water under pressure, a distributor head rotatably secured on said support, a main nozzle extending upwardly and outwardly for distributing water over a predetermined outer area, a secondary nozzle of smaller capacity than said main nozzle for distributing water over an intermediate area of lesser radius than said outer area, a third nozzle of smaller capacity than said secondary nozzle for distributing water over an area inwardly of said intermediate area and immediately adjacent said device, means for locating all of said nozzles in predetermined fixed relation to each other, means for mounting all of said nozzles on said head in predetermined fixed relation to each other such that the reaction thrusts therefrom are substantially balanced with reduced frictional drag on said support, means for balancing the downward forces on said head to substantially reduce the frictional drag therefrom on said support, and low power operating means actuated in response to the flow of water through said device for rotating said head on said support to produce substantially uniform distribution of water over said entire area.

WALTER H. COLES.

REFERENCES CITED

The following references are of record in the file of this patent:

UNITED STATES PATENTS

| Number | Name | Date |
|---|---|---|
| 1,779,983 | Roach | Oct. 28, 1930 |
| 2,223,441 | Coles et al. | Dec. 3, 1940 |
| 2,254,270 | Coles et al. | Sept. 2, 1941 |
| 2,302,040 | Lyndon | Nov. 17, 1942 |
| 2,345,030 | Buckner | Mar. 28, 1944 |
| 2,429,313 | Gilbert | Oct. 21, 1947 |